(12) United States Patent
Chiaramello et al.

(10) Patent No.: US 9,510,189 B2
(45) Date of Patent: Nov. 29, 2016

(54) METHOD AND DEVICE FOR MANAGING A SUBSCRIBER DEVICE

(71) Applicant: GEMALTO SA, Meudon (FR)

(72) Inventors: Daniel Chiaramello, La Ciotat (FR); Aurelia Bordas, La Ciotat (FR); Christophe Lecuyer, La Ciotat (FR); François Zannin, La Ciotat (FR); Jean-François Kuc, La Ciotat (FR); Daniel Mavrakis, La Ciotat (FR); Hervé Troadec, La Ciotat (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 14/898,598

(22) PCT Filed: Jun. 19, 2014

(86) PCT No.: PCT/EP2014/062940
§ 371 (c)(1),
(2) Date: Dec. 15, 2015

(87) PCT Pub. No.: WO2014/202719
PCT Pub. Date: Dec. 24, 2014

(65) Prior Publication Data
US 2016/0135037 A1   May 12, 2016

(30) Foreign Application Priority Data
Jun. 21, 2013 (EP) .................................... 13305856

(51) Int. Cl.
*H04M 1/66* (2006.01)
*H04W 8/22* (2009.01)
(Continued)

(52) U.S. Cl.
CPC ............... *H04W 8/22* (2013.01); *H04M 15/47* (2013.01); *H04W 8/005* (2013.01); *H04W 8/10* (2013.01);
(Continued)

(58) Field of Classification Search
CPC ....... H04W 8/22; H04W 8/10; H04W 8/005; H04W 48/18; H04W 8/02; H04W 64/00; H04W 92/24; H04M 15/47

USPC .................................. 455/456.1, 410, 432.1
See application file for complete search history.

(56) References Cited

U.S. PATENT DOCUMENTS

| | | | | |
|---|---|---|---|---|
| 9,143,942 B2* | 9/2015 | Agarwal | ............... | H04W 12/06 |
| 2002/0120873 A1* | 8/2002 | Salmivalli | ............. | H04W 12/12 |
| | | | | 726/32 |

(Continued)

FOREIGN PATENT DOCUMENTS

| | | |
|---|---|---|
| EP | 1 860 858 A1 | 11/2007 |
| GB | 2 485 552 A | 5/2012 |

(Continued)

OTHER PUBLICATIONS

International Search Report (PCT/ISA/210) issued on Oct. 10, 2014, by the European Patent Office as the International Searching Authority for International Application No. PCT/EP2014/062940.

(Continued)

*Primary Examiner* — Marcus Hammonds
(74) *Attorney, Agent, or Firm* — Buchanan Ingersoll & Rooney PC (57) ABSTRACT

A method for managing a subscriber device includes a first detection step in which a first device detects a first status relating to a presence of a subscriber device under a radio coverage of a home mobile network. In the first detection step, the first device intercepts a message for requesting whether the subscriber device has or has not been stolen, as request message, the request message originating from a Mobile Switching Center relating to the home mobile network and being addressed to an Equipment Identity Register relating to the home mobile network. A corresponding first device is also disclosed.

10 Claims, 2 Drawing Sheets (51) Int. Cl.
*H04M 15/00* (2006.01)
*H04W 12/12* (2009.01)
*H04W 48/18* (2009.01)
*H04W 8/00* (2009.01)
*H04W 8/10* (2009.01)
*H04W 8/02* (2009.01)
*H04W 36/14* (2009.01)
*H04W 64/00* (2009.01)
*H04W 92/24* (2009.01)

(52) U.S. Cl.
CPC ............. *H04W 12/12* (2013.01); *H04W 48/18* (2013.01); *H04W 8/02* (2013.01); *H04W 36/14* (2013.01); *H04W 64/00* (2013.01); *H04W 92/24* (2013.01)

(56) References Cited

U.S. PATENT DOCUMENTS

| | | | |
|---|---|---|---|
| 2004/0005875 A1* | 1/2004 | Ko | H04W 12/12 455/410 |
| 2004/0087305 A1* | 5/2004 | Jiang | H04W 48/18 455/432.1 |
| 2006/0252423 A1* | 11/2006 | Jiang | H04W 8/02 455/432.1 |
| 2007/0032232 A1* | 2/2007 | Bleckert | H04W 12/06 455/433 |
| 2007/0275718 A1* | 11/2007 | Descombes | H04M 3/229 455/435.1 |
| 2014/0004854 A1* | 1/2014 | Veran | H04W 48/18 455/432.1 |

FOREIGN PATENT DOCUMENTS

WO  WO 2004/014101 A2  2/2004
WO  WO 2013/056725 A1  4/2013

OTHER PUBLICATIONS

Search Report issued on Oct. 8, 2013, by the European Patent Office for Application No. 13305856.

* cited by examiner

METHOD AND DEVICE FOR MANAGING A SUBSCRIBER DEVICE

FIELD OF THE INVENTION

The invention relates generally to a method for managing a subscriber device in the field of radio-communications and notably, but not exclusively, in a roaming context. In such a field, the subscriber device may be a subscriber terminal, like a mobile (tele)phone.

Within the present document, the word "roaming" means that a subscriber terminal is attached to a home (mobile) (radio-communication) network and then to a foreign (mobile) (radio-communication) network while going abroad or vice versa, i.e. the terminal is attached to a foreign network and then to the home network while coming back home.

Furthermore, the invention also pertains to a device for managing a subscriber device.

STATE OF THE ART

A mobile phone that is located at a border of a home country is attached to a cell relating to a home network. When moving to a neighbouring foreign country, the mobile phone attaches to a cell relating to a neighbouring foreign network. In such an environment, the mobile phone is under a radio coverage of the home network cell and then a radio coverage of the neighbouring foreign network cell. Conversely, when the mobile phone comes back to the home country, the mobile phone is under a radio coverage of a neighbouring foreign network cell and then a radio coverage of a home network cell.

However, in both described situations, it is desirable to know where a subscriber terminal, as subscriber device, is situated, i.e. under a radio coverage of a home network or out of a radio coverage of the home network.

There is a need to provide a solution that allows knowing where a subscriber device is situated in terms of radio coverage.

SUMMARY OF THE INVENTION

The invention proposes a solution for satisfying the just herein above specified need by providing a method for managing a subscriber terminal.

According to the invention, the method comprises a first detection step in which a first device detects a first status relating to a presence of a subscriber device under a radio coverage of a home mobile network.

The principle of the invention consists in locating a subscriber device under a radio coverage of a home (mobile) network or out of a radio coverage of the home (mobile) network.

It is noteworthy that to detect whether the subscriber device is present or not under a radio coverage of a home network is particularly interesting at a radio border of a home network.

As a matter of fact, it is preferable for, on the one hand, a subscriber to an operator, said home operator, which manages a home network and, on the other hand, the home operator, to be attached to the home network.

This is particularly the case in a roaming context where the subscriber device goes out of or enters into the home network coverage.

Such an invention solution allows locating a subscriber device and, when located notably near a border that is common for two neighbouring networks while still being under a home network coverage, the invention solution allows avoiding a perpetual hand-over or roaming from the home network coverage to the foreign network coverage and/or conversely, i.e. from the foreign network coverage to the home network coverage.

Preferably, the first detection step consists in that the first device intercepts a message for requesting whether the subscriber device has or has not been stolen, as request message, the request message originating from a Mobile Switching Center relating to the home mobile network and being addressed to an Equipment Identity Register relating to the home mobile network.

As soon as a first device receives a message for requesting whether the subscriber device has or has not been stolen, the first device concludes that the subscriber device comes back under a radio coverage of the home network in a real time manner when the subscriber device was previously out of the radio coverage of the home network.

According to a further aspect, the invention is a first device for managing a subscriber device.

According to the invention, the first device is adapted to detect a first status relating to a presence of a subscriber device under a radio coverage of a home mobile network.

As first device, it may be a network entity that is comprised within or connected to the home network, like a so-termed proxy-Equipment Identity Register (or EIR).

BRIEF DESCRIPTION OF THE DRAWINGS

Additional features and advantages of the invention will be more clearly understandable after reading a detailed description of one preferred embodiment of the invention, given as one indicative and non-limitative example, in conjunction with the following drawings.

DETAILED DESCRIPTION

Herein under is considered a case in which the invention method for managing a subscriber device is implemented by, among others, a proxy-EIR, as a network entity and first device, a proxy-HLR, as a network entity and second device, and a server connected to the proxy-EIR and the proxy-HLR.

Naturally, the herein below described embodiment is only for exemplifying purposes and is not considered to reduce the scope of the invention.

Figure 1:
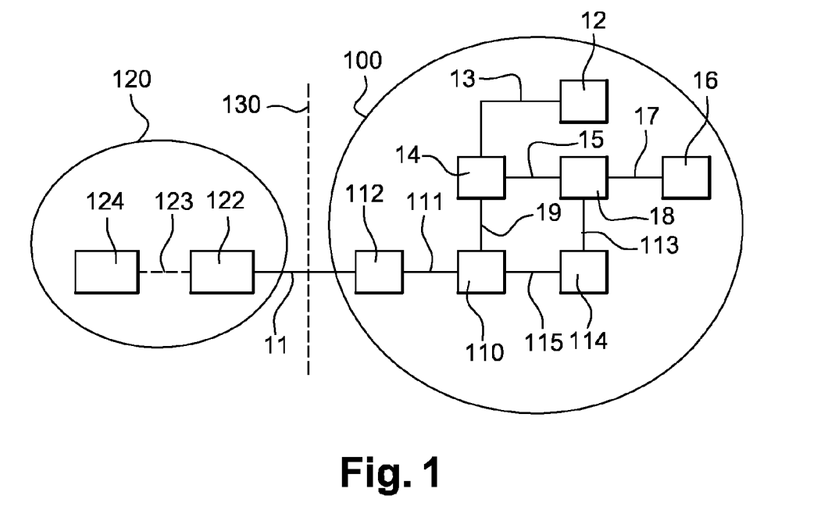
FIG. 1 illustrates a simplified diagram of a home network including, according to one invention embodiment, a MSC, an EIR, a proxy-EIR, an HLR, a proxy-HLR and a server and a neighbouring foreign network with a Visited MSC, so that the server manages a subscriber device.

FIG. 1 shows schematically a home mobile network 100 that is connected to a neighbouring foreign mobile network 120.

For sake of simplicity, the home mobile network 100 and the neighbouring foreign mobile network 120 are termed herein after the home network 100 and the foreign network 120 respectively.

The home network 100 and the foreign network 120 may be constituted by a Global Service for Mobiles (or GSM), a Universal Mobile Telecommunications System (or UMTS), a Code Division Multiple Access (or CDMA) and/or a Long Term Evolution (or LTE) type network(s).

The network list is not exhaustive but only for exemplifying purposes.

The foreign network 120 is bordering on the home network 100.

The home network 100 and the foreign network 120 are close to each other and are neighbours with respect to their respective radio coverage (not represented).

The radio coverage of the home network 100 and the radio coverage of a neighbouring foreign network may both include a geographical border that separates two country regions or two countries.

The foreign network 120 includes several MSCs.

For clarity reason, only one foreign V-MSC 124, as Visited MSC and foreign network entity, is represented.

The V-MSC 124 is connected, through an international link, to the home network 100.

The home network 100 includes an international home gateway 112 while the foreign network 120 includes an international foreign gateway 122.

The international home gateway 112 is connected, through a wire link 11, to the international foreign gateway 122.

The home network 100 includes several Mobile Switching Centres (or MSC).

Only one MSC 12, as home network MSC, is represented for clarity reason.

The MSC 12 is at an area in which one or several subscriber devices (not represented) are located.

The MSC 12 is either connected to a Visitor Location Register (or VLR) (not represented) or integrated with a VLR within one and the same network entity.

The VLR includes a database of the subscribers who have roamed to the area that the MSC 12 serves and manages. The MSC 12 may interrogate the VLR to determine where the subscribers are located.

Each base station (not represented) relating to the home network 100 is served by the VLR.

The MSC 12 is able to route calls, messages and data intended to and/or originating from the subscriber device(s) in the area that is managed by the MSC 12.

The MSC 12 is able to deliver calls to subscribers as soon as they arrive based on data originating from the VLR.

The MSC 12 is able to connect outgoing calls to other subscribers.

The MSC 12 is able to carry out handovers between the MSC 12 to another MSC. Such a MSC may be either an original MSC, i.e. the MSC that manages a call, data communication with the subscriber device that is attached to the MSC, or a target MSC, i.e. the MSC that will continue a call, data communication with the subscriber device that is newly attached to the MSC. Such a MSC, as an MSC 12 interlocutor, is comprised within either the home network 100 or the foreign network 120.

The MSC 12 is connected, through a wire link 13, to a Home Location Register (or HLR) 14.

The MSC 12 is able to obtain from the HLR 14 data about the network subscribers, like the International Mobile Subscriber Identity (or IMSI), as identifiers relating to Subscriber Identity Module (or SIM) type cards, as tokens, and associated terminals, as subscriber devices.

The subscriber device may cooperate or not with a hosting device, so as to operate.

The subscriber device may be any kind of device that may be managed by an operator of the home network 100. The subscriber device has to store at least one identifier relating to the subscriber and user of the device, like an IMSI, or other cooperating device data, like an International Mobile station Equipment Identity (or IMEI) and/or a Mobile Subscriber Integrated Digital network-Number (or MSISDN), that allows a home network entity(ies) to retrieve subscriber identification data.

The subscriber device may be a standalone entity or an entity that cooperates with one or several external devices, like a SIM type card with a mobile phone, as card hosting device and user terminal.

The subscriber device may be, among others, a token, a mobile phone, a handset, a Machine-to-Machine (or M2M) type device, a mobile laptop, a tablet, a Personal Digital Assistant (or PDA), a mobile TeleVision appliance, a game console, a personal computer (or PC), a set-up box and/or a netbook.

Within the present description, a token or termed secure element is a smart electronic object that is intended to communicate with the outside world.

As token, it may be any electronic device comprising at least one microprocessor, as data processing means, at least one memory (or being connected to at least one memory), and at least one Input/Output (or I/O) communication interface(s). The token may be constituted by any electronic medium, like a Secure Removable Module (or SRM). The token may be embodied within a smart card or a dongle of the Universal Serial Bus (or USB) type, a Secure Digital card (or SD card), a Multi-Media Card (or MMC) or a chip to be fixed to a host device, possibly in a removable manner. The token may have different form factors.

The subscriber device may be fixed or mobile.

The subscriber device is located at a place where the subscriber device is under a radio coverage of a home network cell (not represented) and/or a radio coverage of a neighbouring foreign network cell (not represented).

For sake of simplicity, the home network cell and the neighbouring foreign network cell are termed herein after the home cell and the foreign cell respectively.

The subscriber device may be located within a place where the home cell and the foreign cell overlap, i.e. a place where the subscriber device is able to communicate with the home network 100 or the foreign network 120.

The subscriber device may be a SIM type token. The SIM type token is hosted within a user terminal, like a mobile phone. The mobile phone is identified by using an International Mobile station Equipment Identity (or IMEI) or other identification data.

The HLR 14 stores, within a central database (not represented), data relating to the subscribers that are authorized to use the home network 100. The HLR 14 records, e.g. a set of IMSIs, as identifiers relating to the subscriber devices, and each IMSI is associated with a MSISDN that allows to route or connect data to the hosting mobile phone, as user terminal.

The VLR is able to inform the HLR 14 that a subscriber device has arrived into the area covered by the VLR.

The home network 100 includes an Equipment Identity Register (or EIR) 16.

The EIR 16 may be integrated within the HLR 14.

The EIR 16 stores, within a central database (not represented), a set of identifiers of mobile subscriber devices which are to be forbidden to access the home network 100.

The EIR 16 is able to track mobile devices that are stolen or the like, as being unauthorized to access the home network 100.

The home network 100 includes a proxy-EIR 18.

The proxy-EIR 18 is connected, on the one hand, through a wire link 15, to the HLR 14 and, on the other hand, through another wire link 17, to the EIR 16.

According to an alternative embodiment, when the EIR is integrated within the HLR, the proxy-EIR is also integrated within the HLR.

The proxy-EIR 18 is adapted to receive any message intended to the EIR 16 and forward the received message to the EIR 16.

The proxy-EIR 18 is preferably standard and compliant with the home network infrastructure.

The proxy-EIR 18 plays a role of a relay between the EIR 16 and the MSC 12.

The proxy-EIR 18, as first device, is adapted to detect a first status relating to a presence of a subscriber device under a radio coverage of the home network 100.

To carry out such a home network coverage presence detection, the proxy-EIR 18 is configured to intercept a message that originates from the MSC 12 and is addressed to the EIR 16.

The intercepted message includes a request for determining whether the subscriber device has or has not been stolen or the like.

Alternately, the intercepted message includes a request for determining whether the subscriber device is or is not authorized to use the home network 100.

According to another alternative embodiment, the intercepted message includes a request for determining whether the subscriber device is or is not defective.

The intercepted message includes a request for determining whether the subscriber device is authorized or forbidden to access the home network 100.

The home network 100 includes a proxy-HLR 110.

The proxy-HLR 110 is connected, on the one hand, through a wire link 19, to the HLR 14 and, on the other hand, through an international wire link 111, to the international home gateway 112.

The proxy-HLR 110 is adapted to receive any message intended to the HLR 14. The proxy-HLR 110 is configured to forward the received message to the HLR 14.

The proxy-HLR 110 is preferably standard and compliant with the home network infrastructure.

The proxy-HLR 110 plays a role of a relay between the V-MSC 124 and the HLR 14.

The proxy-HLR 110, as second device, is adapted to detect a second status relating to a presence of a subscriber device under a radio coverage of the neighbouring foreign network 120.

To carry out such a foreign (network) coverage presence detection, the proxy-HLR 110 is configured to intercept a message that originates from the V-MSC 124 and is addressed to the home network HLR 14.

The intercepted message includes a request for updating a location of the subscriber device or the like.

A server 114, as a third device, is connected, through a wire link 113, to the proxy-EIR 18.

The server 114, as Over-The-Air (or OTA) or Over-The-Internet (or OTI) server, is preferably included within the home network 100.

Alternately, the server is connected to the home network 100.

The server 114 is addressable, through an IP address or a global title, as SS7' server address.

The server 114 is also connected, through a wire link 115, to the proxy-HLR 110.

The proxy-EIR 18 is adapted either to forward to the server 114 any intercepted message that is intended to the EIR 16 or to inform the server 114 that the MSC 12 sends to the EIR 18 a message that the proxy-EIR 18 has previously interpreted on behalf of the server 114.

The proxy-HLR 110 is adapted to either forward to the server 114 any intercepted message that is intended to the HLR 14 or inform the server 114 that the V-MSC 124 sends, via the international foreign gateway 122, to the HLR 14 a message that the proxy-HLR 110 has previously interpreted on behalf of the server 114.

The server 114 includes a microprocessor (not represented), as means for processing data, at least one memory (not represented) for storing data and at least two I/O interfaces (not represented) for exchanging data with outside.

The server 114 is adapted to survey data traffic over, on the one hand, through the proxy-HLR 110, one international wire link 111 and, on the other hand, through the proxy-EIR 18, over one national wire link 15.

The server 114 is adapted to interpret any message that is intercepted by the proxy-EIR 18 and/or the proxy-HLR 110 and/or to collect information from the proxy-EIR 18 and/or the proxy-HLR 110 that has(have) interpreted any message that the proxy-EIR 18 and/or the proxy-HLR 110 has(have) intercepted.

The server 114 centralizes information about the home coverage presence detection and information about the foreign coverage presence detection and their sequencing, i.e. the order of their respective arrival or determination.

The server 114 may further centralize a set of one or several identifiers relating to home cells that adjoin a neighbouring foreign cell(s).

The server 114 is configured to set a first status relating to a presence of a subscriber device under a radio coverage of the home network 100 or a second status relating to a presence of a subscriber device under a radio coverage of the neighbouring foreign network 120.

The server 114 plays preferably a role of a manager of subscriber devices.

According to another embodiment (not represented), instead of the server, the proxy-EIR is directly connected to the proxy-HLR and the proxy-EIR collects information about the foreign coverage presence detection carried out by the proxy-HLR and plays the role of a manager of subscriber devices.

According to still another embodiment (not represented), instead of the server, the proxy-HLR is directly connected to the proxy-EIR and the proxy-HLR collects information about the home coverage presence detection carried out by the proxy-EIR and plays the role of a manager of subscriber devices.

Such two alternative embodiments allow each to have only two additional network entities, namely the proxy-EIR and the Proxy-HLR, instead of adding three entities, namely the proxy-EIR, the proxy-HLR and the server.

Two scenarios for a follow-up of a subscriber device communication between the home network 100 and the foreign network 120 are possible. These scenarios are described herein below.

Figure 2:
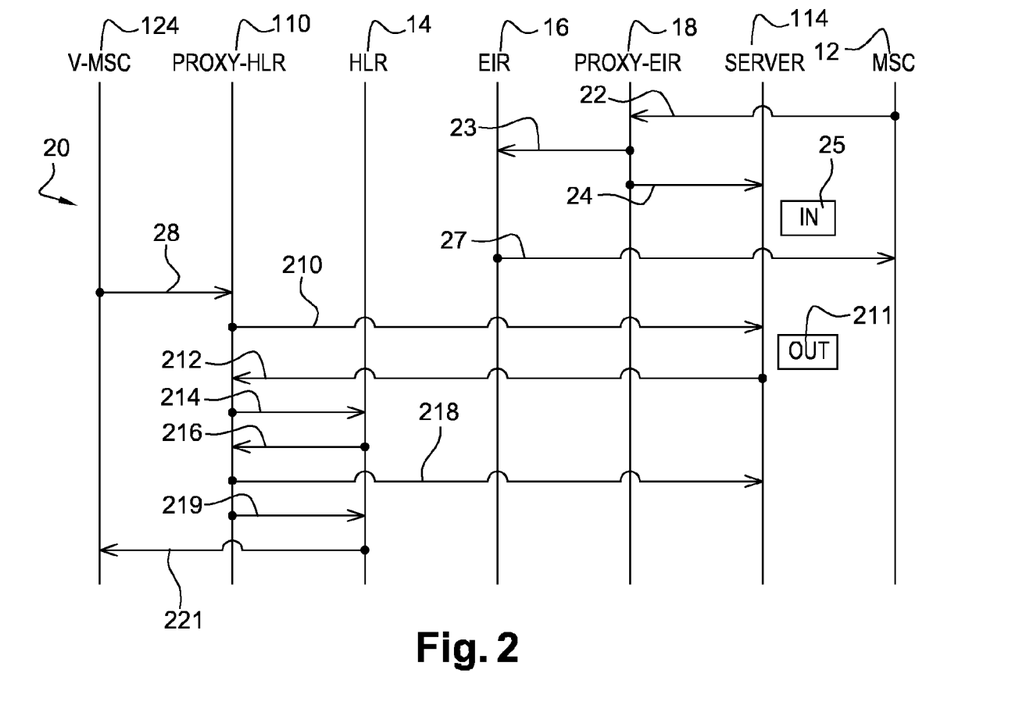
FIG. 2 represents one message flow, according to a first invention method embodiment, between the network entities of the FIG. 1, so that the server is able, on the one hand, to detect a presence of a subscriber device under firstly a home radio coverage and secondly a neighbouring foreign radio coverage and, on the other hand, to retrieve a home border cell identity.

FIG. 2 depicts an exemplary embodiment of the invention method 20 for managing a mobile phone, as subscriber device.

It is assumed that the server 114 is dedicated to tracking subscriber devices, i.e. to know whether the subscriber devices enters into or exits out of a home (network) coverage from or to a neighbouring foreign (network) coverage.

It is further assumed that at least one mobile phone, as subscriber device, is roaming from the home network 100 to the foreign network 120.

As soon as the mobile phone is switched on, the mobile phone communicates with a base station(s) relating to the home network 100 and attaches, through the home base station(s), to the MSC 12.

The network entities exchange data by using a Mobile Application Protocol (or MAP) type protocol or the like. The network entities may exchange by using any kind of communication protocol.

The MSC 112 sends a Check_IMEI event, as a message 22 for requesting whether the mobile phone has or has not been stolen or the like. Such a query or requesting message 22 is intended to the EIR 16. The requesting message 22 allows the MSC 12 to know, based upon a corresponding response, whether the mobile phone is allowed or disallowed to access the home network 100.

The proxy-EIR 18 intercepts the requesting message 22.

The proxy-EIR 18 sends to the EIR 16 the Check_IMEI event or the like, as a message 23 for requesting whether the mobile phone has or has not been stolen or the like. The proxy-EIR 18 relays the message(s) that is(are) exchanged between the MSC 12 and the EIR 16, i.e. the sent message 23 is the received requesting message 22.

The proxy-EIR 18, as first device, detects that the mobile phone is present under a radio coverage of the home network 100.

The proxy-EIR 18 sends to the server 114 a message 24 for informing that the mobile phone is present under a radio coverage of the home network 100.

Instead of a home coverage detection message 24, the proxy-EIR 18 sends to the server 114 the message that is intercepted by the proxy-EIR 18. According to such an alternative, the proxy-EIR 18 forwards the intercepted message to the server 114 and the server 114 interprets and analyses the intercepted message, so as to determine whether the mobile phone is or is not present under a radio coverage of the home network 100.

The home coverage detection message 24 may be a message including a command for setting a first status relating to a presence of the mobile phone under a radio coverage of the home network 100.

When applicable, the server 114 is thus informed that the subscriber device is located in an area that is accessible, through a mobile radio-communication link, from/to the home network 100.

The server 114 sets a first status "IN" (or "AT HOME") 25 relating to the detected mobile phone, as being present within a home network cell. A radio-coverage of the home network cell allows the mobile phone to communicate with one or several base stations relating to the home network 100.

To set the first status "IN" 25 relating to a presence of the mobile phone under a radio-coverage of the home network 100, the server 114 may set a flag to a predetermined first value, like a bit value "1". The thus set flag is associated with the concerned detected (identified) mobile phone.

The server 114 registers, within a central database, the first status "IN" 25 relating to the detected mobile phone as being present under the radio coverage of the home network 100.

The EIR 18 sends directly to the MSC 12 a message 27 for indicating that the mobile phone is either disallowed i.e. stolen, lost or the like, or allowed, i.e. not stolen, not lost or the like.

The mobile phone may have slightly (up to some tens of meters) moved or may remain quasi or almost at the same location.

The mobile phone may have crossed a geographical border between two regions and/or countries.

The mobile phone may then attempt to attach to the foreign network 120.

The V-MSC 124 relating to the foreign network 120 is then informed about the mobile phone attempt of attachment to the foreign network 120.

The V-MSC 124 sends an Update Location Request, as a message 28 for updating a location of the mobile phone. Such a location updating message 28 is intended to the HLR 14 relating to the home network 100. The location updating message 28 allows the HLR 14 to know that the mobile phone is able to attach to the foreign network 120 and to authorize or forbid (refuse or cancel) to attach to the foreign network 120.

The proxy-HLR 110 intercepts the location updating message 28.

The proxy-HLR 110 sends to the server 114 a message 210 for informing that the mobile phone is present under a radio coverage of the foreign network 120.

Instead of a foreign coverage detection message 210, the proxy-HLR 110 sends to the server 114 the message that is intercepted by the proxy-HLR 110. According to such an alternative, the proxy-HLR 110 forwards the intercepted message to the server 114 and the server 114 interprets and analyses the intercepted message, so as to determine whether the mobile phone is or is not present under a radio-coverage of the foreign network 120.

The foreign coverage detection message 210 may be a message including a command for setting a second status relating to a presence of the mobile phone under a radio-coverage of the foreign network 120.

When applicable, the server 114 is thus informed that the subscriber device is located in an area that is accessible, through a mobile radio-communication link, from/to the foreign network 120.

The server 114 sets a second status "OUT" (or "ROAMING") 211 relating to the detected mobile phone, as being present within a foreign network cell. A radio-coverage of the foreign network cell allows the mobile phone to communicate with one or several base stations relating to the foreign network 120.

To set the second status relating to a presence of the mobile phone under a radio-coverage of the foreign network 120, the server 114 may set a flag to a predetermined second value, like a bit value "0". The predetermined second value is different from the predetermined first value relating to a presence of the mobile phone under a radio-coverage of the home network 100. The thus set flag is associated with the concerned detected mobile phone.

The server 114 registers, within a central database, the second status "OUT" 211 relating to the detected mobile phone as being present under the radio coverage of the foreign network 120.

Thus, the server 114 detects that the mobile phone is successively under a radio-coverage of the home network 100 and under a radio-coverage of the foreign network 120. The server 114 detects a transition from a first status relating to a presence of a mobile phone, as subscriber device, under a radio-coverage of the home network 100 to a second status relating to a presence of the mobile phone under a radio-coverage of a foreign network 120 that is neighbouring the home network 100.

The server 114 sends to the proxy-HLR 110 a message 212 for retrieving a home border cell identity.

The proxy-HLR 110 sends to the HLR 14 an Any Time Interrogation (or ATI), as a message 214 including a request for getting an identity relating to the latest known cell. The ATI message allows requesting to the HLR 14 location information. Then, as known per se, the HLR 14 queries the appropriate home network MSC to carry out a VLR look-up to get the requested location information.

The HLR 14 sends to the proxy-HLR 110 a message 216, as request response, including the latest known cell identity, as home border cell identity.

Once the proxy-HLR 110 has received the request response, the proxy-HLR 110 sends to the server 114 a message 218 including the latest known cell identity.

The server 114 retrieves the latest known cell identity, as home border cell identity. The server 114 is therefore able to collect all the home border cell identities. The server 114 is thus able to build automatically a topology of the home network 100 where one or several home cells are identified as being in a border area of a neighbouring foreign network 120.

Thus, after such an identification of the home border cell, if a subscriber device is detected as being present under a radio-coverage of a retrieved home border cell, then, when the HLR 14 receives from the V-MSC 124 an Update Location Request or the like, the HLR 14 sends to the V-MSC 124 an error within an Update Location Response or the like. Thus, it allows the HLR 14 to force the subscriber device to try to attach to the home network 100. Such a forcing operation may involve the subscriber device user that has to reboot her/his subscriber device. When successful, i.e. when the subscriber device is attached to the home network 100 instead of the foreign network 120, the subscriber device is kept under a radio-coverage of the home network 100. The subscriber device may be avoided to roam in an accidental manner.

The proxy-HLR 110 sends to the HLR 14 the Update Location Request or the like, as a message 219 for updating a location of the mobile phone or the like. The proxy-HLR 110 relays the message(s) that is(are) exchanged between the V-MSC 124 and the HLR 14, i.e. the sent message 219 is the received location updating message 28.

The HLR 14 sends to the V-MSC 124 a message 221 for acknowledging a receipt of the Update Location Request or the like.

The invention solution allows detecting a subscriber device exit out of the home network 100.

The invention solution is user friendly since the user is not involved except for a possible manual activation of a reboot of the subscriber device.

The invention solution is simple and therefore cheap to implement since only two communication links, namely one national (home) link and one international interconnection link between the home network 100 and the foreign network 120, are to be monitored.

The invention solution is compatible with notably the existing mobile network infrastructures and the existing exchanged messages between the network entities. No additional Signalling System N°7 (or SS7) signalling message is required.

The invention solution offers a real time tracking since it is based on an interception of messages that are exchanged between the different network entities as soon as the home network 100 and the foreign network 120 detect the subscriber device presence under its own radio-coverage.

Figure 3:
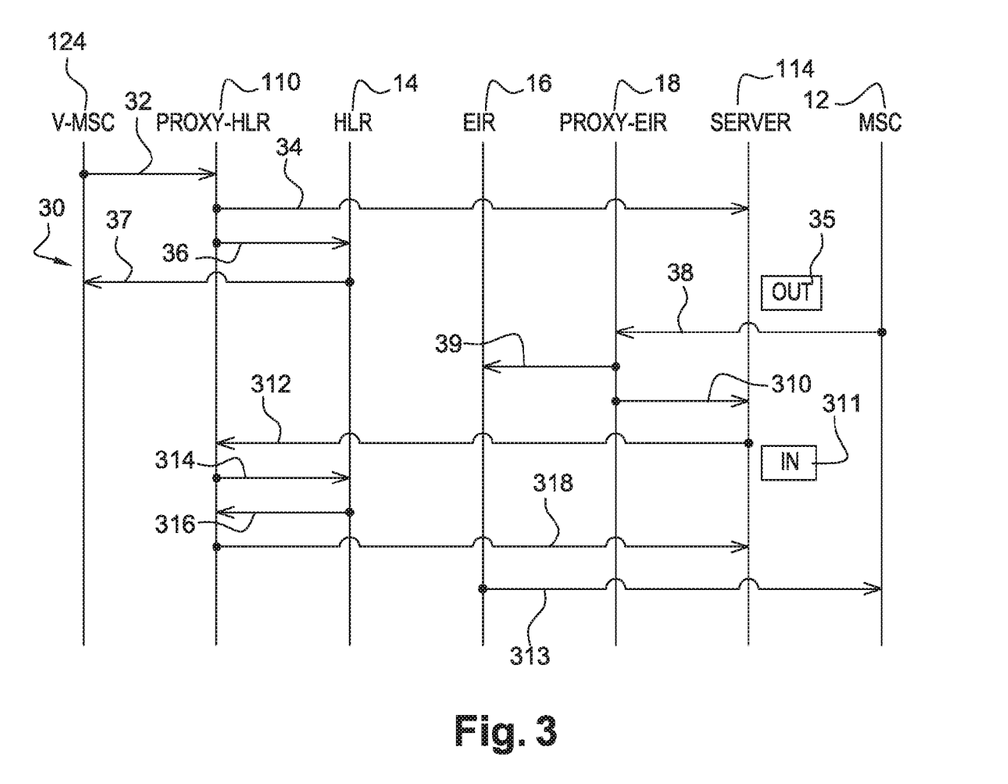
FIG. 3 is another message flow, according to a second invention method embodiment, between the network entities of the FIG. 1, so that the server is able to detect a presence of a subscriber device under firstly a neighbouring foreign radio coverage and secondly a home radio coverage.

FIG. 3 shows an exemplary embodiment of the invention method 30 for managing a mobile phone, as subscriber device.

It is assumed that the server 114 is dedicated to tracking subscriber devices.

It is further assumed that at least one mobile phone, as subscriber device, is roaming from the foreign network 120 to the home network 100.

As soon as the mobile phone is switched on, the mobile phone communicates with a base station(s) relating to the foreign network 120 and attaches, through the foreign base station(s), to the V-MSC 124.

The network entities exchange data by using a Mobile Application Protocol (or MAP) type protocol or the like. The network entities may exchange by using any kind of communication protocol.

The V-MSC 124 sends an Update Location Request or the like, as a message 32 for updating a location of the mobile phone or the like.

Such a location updating message 32 is intended to the HLR 14 relating to the home network 100. The location updating message 32 allows the HLR 14 to know that the mobile phone is able to attach to the foreign network 120 and to authorize or forbid to attach to the foreign network 120.

The proxy-HLR 110 intercepts the location updating message 32.

The proxy-HLR 110 sends to the server 114 a message 34 for informing that the mobile phone is present under a radio-coverage of the foreign network 120.

Instead of a foreign coverage detection message 34, the proxy-HLR 34 sends to the server 114 the message that is intercepted by the proxy-HLR 110. According to such an alternative, the proxy-HLR 110 forwards the intercepted message to the server 114 and the server 114 interprets and analyses the intercepted message, so as to determine whether the mobile phone is or is not present under a radio-coverage of the foreign network 120.

The foreign coverage detection message 34 may be a message including a command for setting a second status relating to a presence of the mobile phone under a radio-coverage of the foreign network 120.

When applicable, the server 114 is thus informed that the subscriber device is located in an area that is accessible, through a mobile radio-communication link, from/to the foreign network 120.

The server 114 sets a second status "OUT" (or "ROAMING") 35 relating to the detected mobile phone, as being present within a foreign network cell. A radio-coverage of the foreign network cell allows the mobile phone to communicate with one or several base stations relating to the foreign network 120.

To set the second status "OUT" 35 relating to a presence of the mobile phone under a radio-coverage of the foreign network 120, the server 114 may set a flag to a predetermined second value, like a bit value "0". The predetermined second value is different from a predetermined first value that is related to a first status relating to a presence of the mobile phone under a radio-coverage of the home network 100. The thus set flag is associated with the concerned detected mobile phone.

The server 114 registers, within a central database, the second status "OUT" 35 relating to the detected mobile phone as being present under the radio coverage of the foreign network 120.

The proxy-HLR 110 sends to the HLR 14 the Update Location Request or the like, as a message 36 for updating a location of the mobile phone or the like. The proxy-HLR 110 relays the message(s) that is(are) exchanged between the V-MSC 124 and the HLR 14, i.e. the sent message 36 is the received location updating message 32.

The HLR 14 sends to the V-MSC 124 a message 37 for acknowledging a receipt of the Update Location Request or the like.

The mobile phone may have slightly (up to some tens of meters) moved or may remain quasi or almost at the same location.

The mobile phone may have crossed a geographical border between two regions and/or countries.

The mobile phone attaches to the home network 100.

As soon as the mobile phone is attached to the home network, the MSC 12 sends a Check_IMEI event, as a message 38 for requesting whether the mobile phone has or has not been stolen or the like. Such a query or requesting message 38 is intended to the EIR 16. The requesting message 38 allows the MSC 12 to know, based upon a corresponding response, whether the mobile phone is allowed or disallowed to access the home network 100.

The proxy-EIR 18 intercepts the requesting message 38.

The proxy-EIR 18 sends to the EIR 16 the Check_IMEI event or the like, as a message 39 for requesting whether the mobile phone has or has not been stolen or the like. The proxy-EIR 18 relays the message(s) that is(are) exchanged between the MSC 12 and the EIR 16, i.e. the sent message 39 is the received requesting message 38.

The proxy-EIR 18, as first device, detects that the mobile phone is present under a radio-coverage of the home network 100.

The proxy-EIR 18 sends to the server 114 a message 310 for informing that the mobile phone is present under a radio-coverage of the home network 100.

Instead of a home coverage detection message 310, the proxy-EIR 18 sends to the server 114 the message that is intercepted by the proxy-EIR 18. According to such an alternative, the proxy-EIR 18 forwards the intercepted message to the server 114 and the server 114 interprets and analyses the intercepted message. The server 114 is able to determine whether the mobile phone is or is not present under a radio-coverage of the home network 100.

The home coverage detection message 310 may be a message including a command for setting a first status relating to a presence of the mobile phone under a radio-coverage of the home network 100.

When applicable, the server 114 is thus informed that the subscriber device is located in an area that is accessible, through a mobile radio-communication link, from/to the home network 100.

The server 114 sets a first status "IN" (or "AT HOME") 311 relating to the detected mobile phone, as being present within a home network cell. A radio-coverage of the home network cell allows the mobile phone to communicate with one or several base stations relating to the home network 100.

To set the first status "IN" 311 relating to a presence of the mobile phone under a radio-coverage of the home network 100, the server 114 may set a flag to a predetermined first value, like a bit value "1". The thus set flag is associated with the concerned detected (identified) mobile phone.

The server 114 registers, within a central database, the first status "IN" 311 relating to the detected mobile phone as being present under the radio coverage of the home network 100.

The server 114 sends to the proxy-HLR 110 a message 312 for retrieving a home border cell identity.

The proxy-HLR 110 sends to the HLR 14 an ATI, as a message 314 including a request for getting an identity relating to the latest known cell. The ATI message allows requesting to the HLR 14 location information. Then, as known per se, the HLR 14 queries the appropriate home network MSC to carry out a VLR look-up to get the requested location information.

The HLR 14 sends to the proxy-HLR 110 a message 316, as request response, including the latest known cell identity, as home border cell identity.

Once the proxy-HLR 110 has received the request response, the proxy-HLR 110 sends to the server 114 a message 318 including the latest known cell identity.

The server 114 retrieves the latest known cell identity, as home border cell identity. The server 114 is therefore able to collect all the home border cell identities. The server 114 is thus able to build automatically a topology of the home network 100 where one or several home cells are identified as being in a border area of a neighbouring foreign network 120.

Thus, after such an identification of the home border cell, if a subscriber device is detected as being present under a radio-coverage of a retrieved home border cell, then, when the HLR 14 receives from the V-MSC 124 an Update Location Request or the like, the HLR 14 sends to the V-MSC 124 an error within an Update Location Response or the like. Thus, it allows the HLR 14 to force the subscriber device to attempt to attach to the home network 100. Such a forcing operation may involve the subscriber device user that has to reboot her/his subscriber device. When successful, i.e. when the subscriber device is attached to the home network 100 instead of the foreign network 120, the subscriber device is kept under a radio-coverage of the home network 100. The subscriber device may be avoided to roam in an accidental manner.

The EIR 18 sends directly to the MSC 12 a message 313 for indicating that the mobile phone is either disallowed, i.e. stolen, lost or the like, or allowed, i.e. not stolen, not lost or the like.

The invention solution allows detecting a subscriber device comeback to the home network 100.

The invention solution is user friendly since the user is not involved.

The invention solution is simple and therefore cheap to implement since only two communication links, namely one national (home) link and one international interconnection link between the home network 100 and the foreign network 120, are to be monitored.

The invention solution is compatible with notably the existing mobile network infrastructures and the existing exchanged messages between the network entities. No additional SS7 signalling message is required.

The invention solution offers a real time tracking since it is based on an interception of messages that are exchanged between the different network entities as soon as the home network 100 and the foreign network 120 detect the subscriber device presence under its own radio-coverage.

The embodiments that have just been described are not intended to limit the scope of the concerned invention. Other embodiments may be given. As another embodiment example(s), instead of exchanging with a dedicated server connected to the proxy-EIR 18 and the proxy-HLR 110, either the proxy-EIR 18 or the proxy-HLR 110 is dedicated to tracking subscriber devices and is connected to either the proxy-HLR 110 or the proxy-EIR 18 respectively.

According to another embodiment, instead of being implemented by mobile network entities relating to the GSM and/or UMTS network, the man skilled in the art is able to implement the invention by using mobile network entities relating to the LTE network (or other) and corresponding messages. Among others, a Home Subscriber Server (or HSS) relating to the LTE network replaces the HLR relating to the UMTS network and a Mobility Management (or MME) entity relating to the LTE network replaces the MSC relating to the UMTS network while the EIR remains unchanged.

The invention claimed is:

1. A method for managing a subscriber device, the method comprising a first detection step in which a first device detects a first status relating to a presence of the subscriber device under a radio coverage of a home mobile network,
   wherein the first detection step comprises the first device intercepting a message for requesting whether the subscriber device has or has not been stolen, as a request message, wherein the request message originates from a Mobile Switching Center relating to the home mobile network and is addressed to an Equipment Identity Register relating to the home mobile network;
   wherein the method further comprises a second detection step in which a second device detects a second status relating to a presence of the subscriber device under a radio coverage of a foreign mobile network that borders the home mobile network;
   wherein, when the subscriber device is detected under the radio coverage of the home mobile network and under the radio coverage of the foreign mobile network, the first device, the second device, or a third device registers the first status and the second status; and
   wherein the method further comprises a home border cell identity retrieval step in which the second device sends to a Home Location Register relating to the home mobile network an identity request for getting an identity relating to a latest known cell, the Home Location Register relating to the home mobile network sends to the second device a message, as a response to the identity request, including the latest known cell identity, and the first device, the second device, or a third device registers the latest known cell identity.

2. The method according to claim 1, wherein the second detection step comprises the second device intercepting a message for updating a location of the subscriber device, as a location updating message, wherein the location updating message originates from a Mobile Switching Center relating to the foreign mobile network and is addressed to the Home Location Register relating to the home mobile network.

3. The method according to claim 1, wherein the method further comprises a foreign mobile network attachment refusal step in which, if the subscriber device is detected as being present under a radio-coverage of a retrieved home border cell, then, when the Home Location Register relating to the home mobile network receives from a Visited Mobile Switching Center an Update Location Request, the Home Location Register relating to the home mobile network sends to the Visited Mobile Switching Center an error within a corresponding Update Location Response.

4. The method according to claim 1, wherein the method comprises successively the second detection step and the first detection step, the subscriber device being detected successively under the radio coverage of the foreign mobile network and under the radio coverage of the home mobile network, the second device sending to the third device a message including the second status, the first device sending to the third device a message including the first status.

5. The method according to claim 1, wherein the subscriber device includes a token, a handset, a mobile phone, a Machine-to-Machine device, a Personal Digital Assistant, a mobile laptop, a tablet, a netbook, a mobile TeleVision appliance and a game console.

6. A first device for managing a subscriber device,
   the first device comprising a home presence detector for detecting a first status relating to a presence of the subscriber device under a radio coverage of a home mobile network
   wherein the home presence detector is configured to intercept a message for requesting whether the subscriber device has or has not been stolen, as a request message, the request message originating from a Mobile Switching Center relating to the home mobile network and being addressed to an Equipment Identity Register -relating to the home mobile network;
   wherein the first device further comprises a foreign presence detector for detecting a second status relating to a presence of the subscriber device under a radio coverage of a foreign mobile network that borders the home mobile network;
   wherein, when the subscriber device is detected under the radio coverage of the home mobile network and under the radio coverage of the foreign mobile network, the first device is configured to register the first status and the second status;
   wherein the first device comprises a home border cell identity retriever, the home border cell identity retriever is configured to send to the Home Location Register relating to the home mobile network an identity request for getting an identity relating to a latest known cell, the home border cell identity retriever is configured to receive from the Home Location Register relating to the home mobile network a message, as a response to the identity request, including the latest known cell identity; and
   wherein the first device is configured to register the latest known cell identity.

7. The device according to claim 6, wherein the first device includes a server.

8. A system for managing a subscriber device, the system comprising a home presence detector for detecting a first status relating to a presence of the subscriber device under a radio coverage of a home mobile network,
   wherein the home presence detector is configured to intercept a message for requesting whether the subscriber device has or has not been stolen, as a request message, the request message originating from a Mobile Switching Center relating to the home mobile network and being addressed to an Equipment Identity Register relating to the home mobile network;
   wherein, the system comprises a foreign presence detector, the foreign presence detector is configured to detect a second status relating to a presence of the subscriber device under a radio coverage of a foreign mobile network that borders the home mobile network;
   wherein, when the subscriber device is detected under the radio coverage of the home mobile network and under the radio coverage of the foreign mobile network, the system is configured to register the first status and the second status;
   wherein, the system further comprises a home border cell identity retriever, the home border cell identity retriever is configured to send to a Home Location Register relating to the home mobile network an identity request for getting an identity relating to a latest known cell, and the home border cell identity retriever is configured to receive from the Home Location Register relating to the home mobile network a message, as a response to the identity request, including the latest known cell identity; and wherein the system is configured to register the latest known cell identity.

9. The system according to claim 8, wherein, the system comprises a first device and at least one second device, the first device includes the home presence detector, the second device includes the foreign presence detector and the home border cell identity retriever, the first device or the second device includes a register of the first status and the second status and a register of the latest known cell identity.

10. The system according to claim 8, wherein, the system comprises a first device, a second device and a third device, the first device includes the home presence detector, the second device includes the foreign presence detector and the home border cell identity retriever, the third device includes a register of the first status and the second status and a register of the latest known cell identity.

* * * * *